Sept. 29, 1959          D. J. PAGE ET AL          2,906,069
APPARATUS AND METHOD FOR WRAPPING PACKAGES
Filed Dec. 20, 1955          14 Sheets-Sheet 1
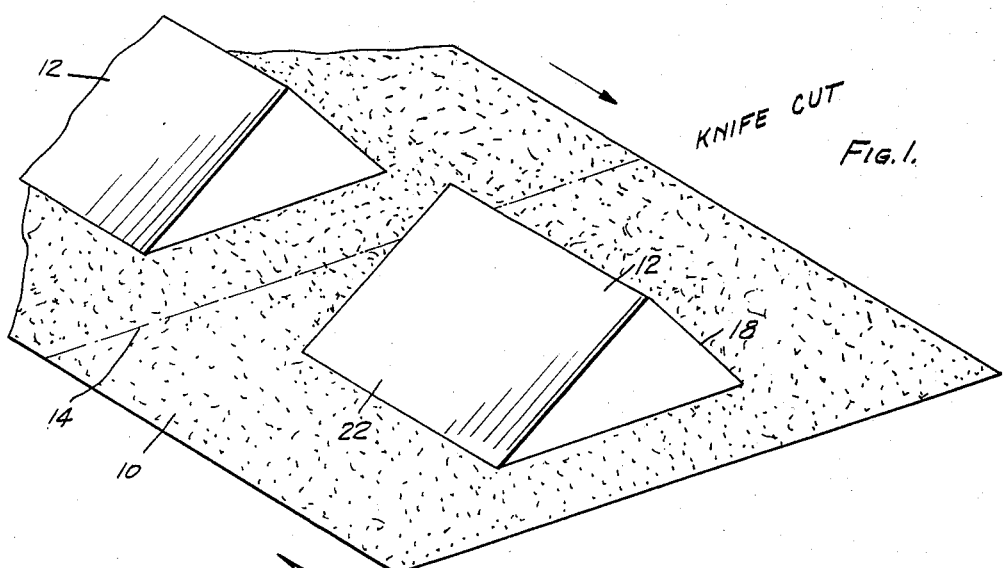
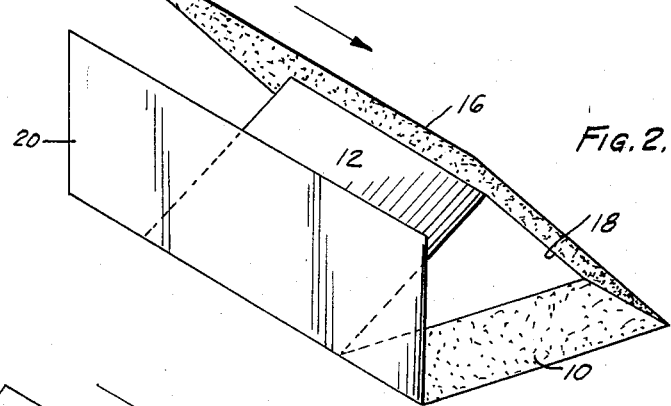
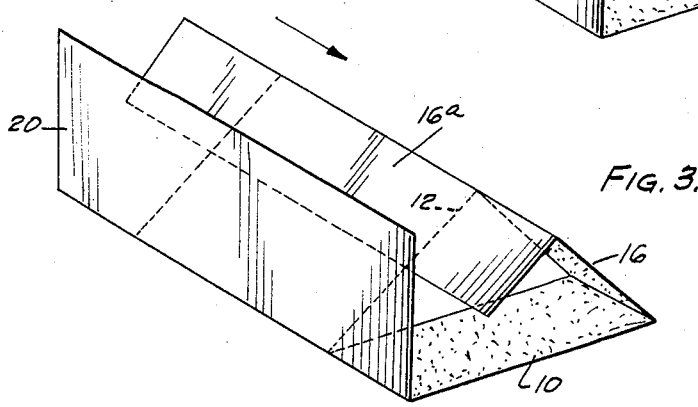
INVENTORS
DONALD J. PAGE
WILLIAM H. LUCAS
BY Harry H. Hitzeman
ATTORNEY

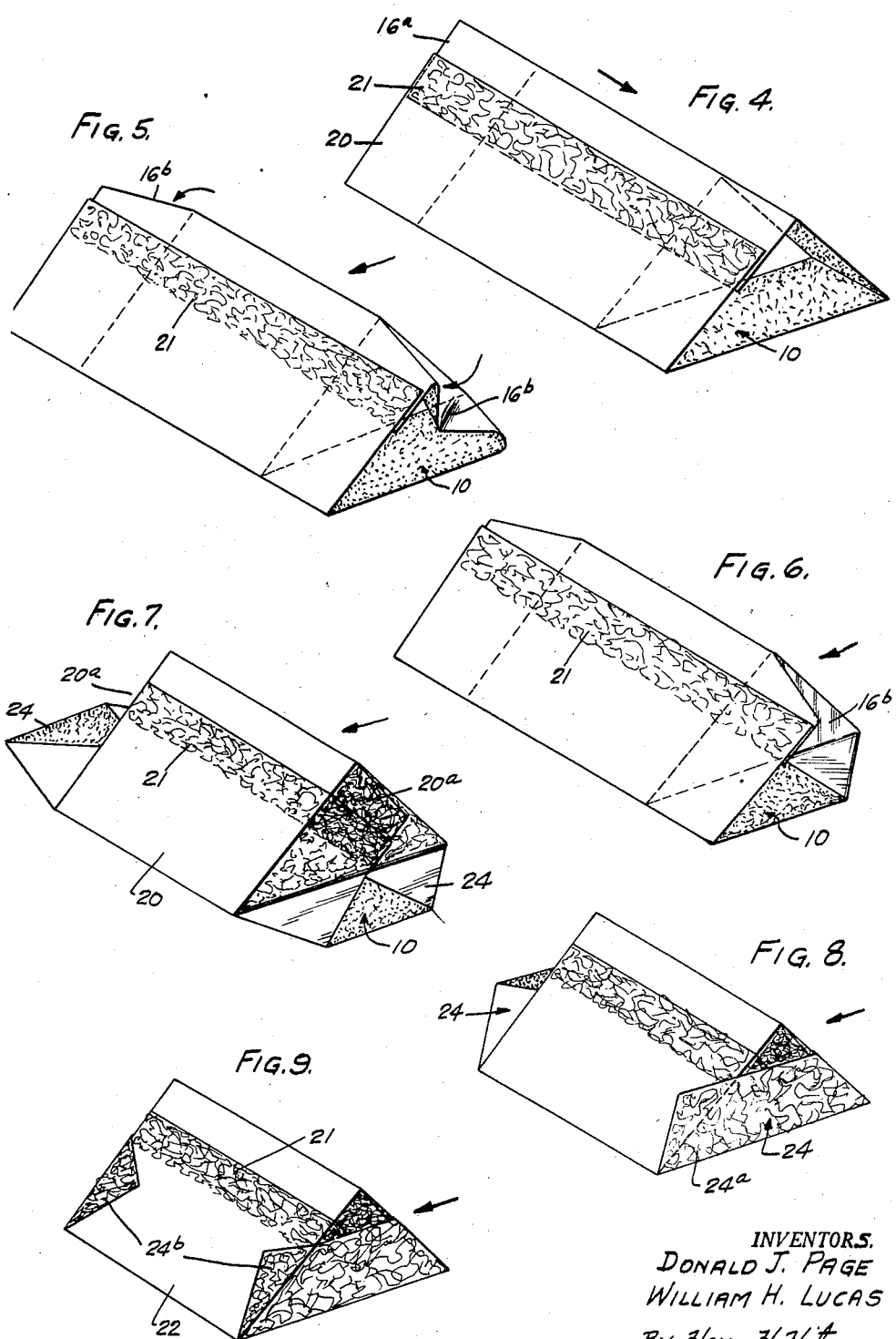

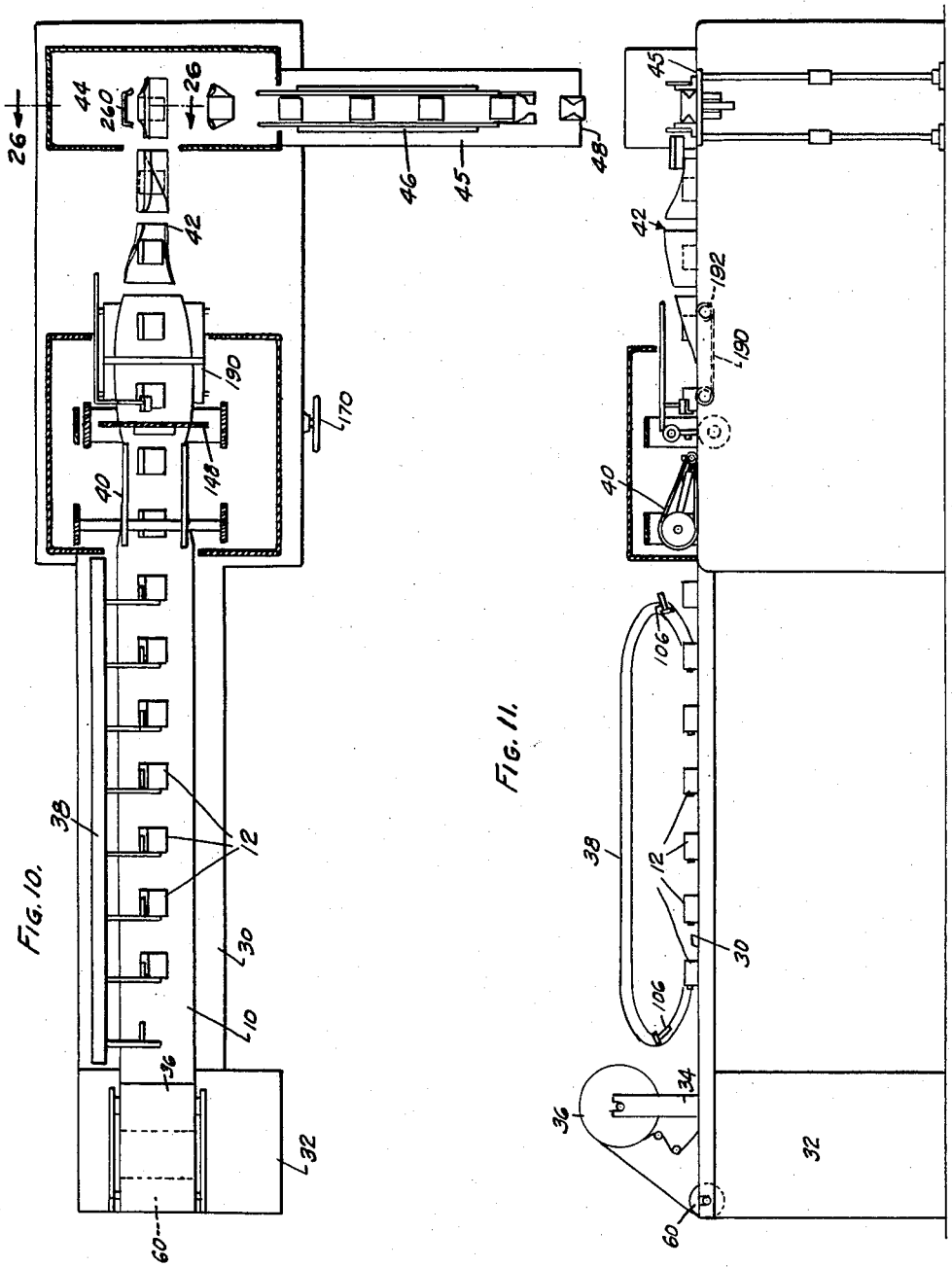

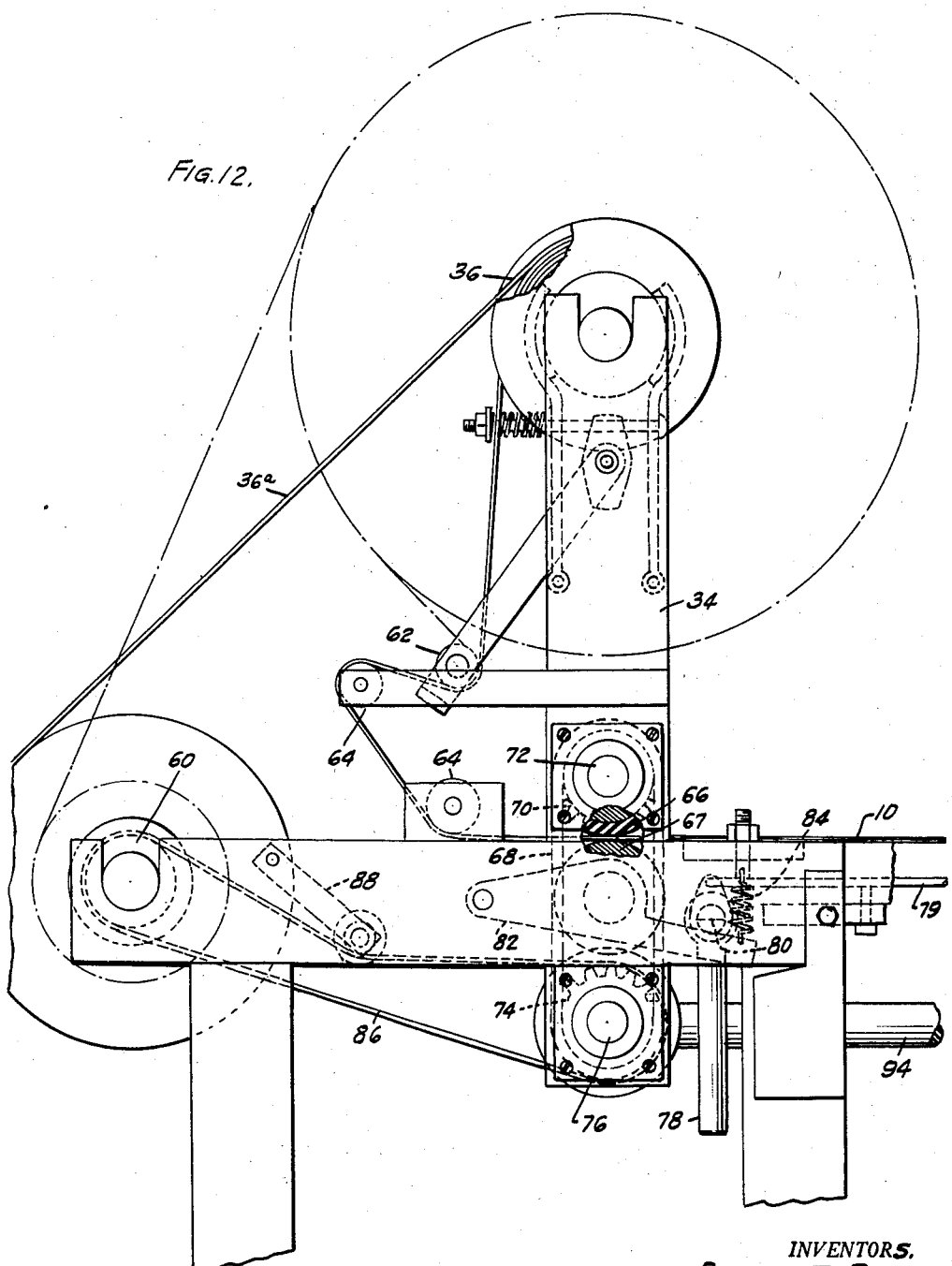

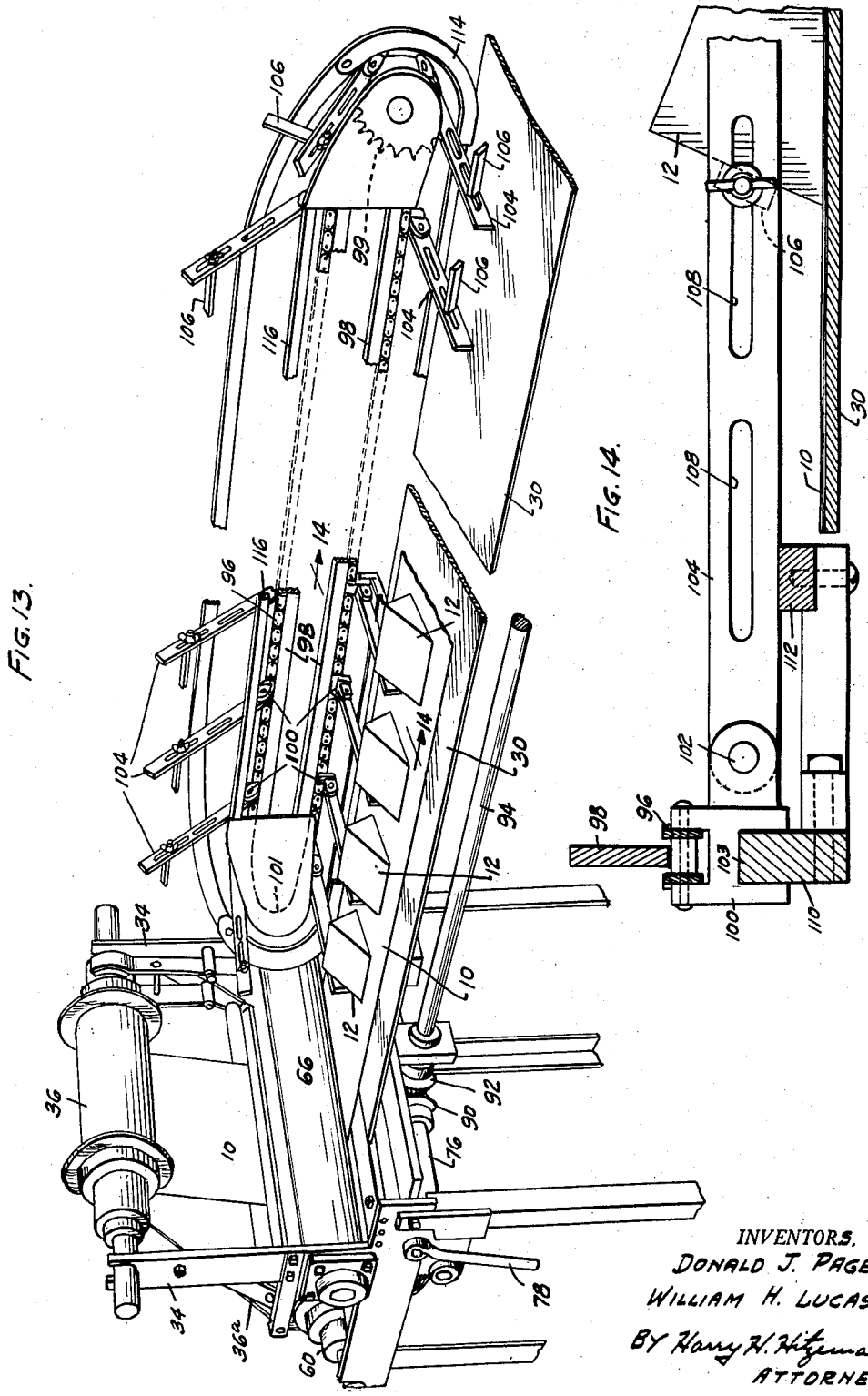

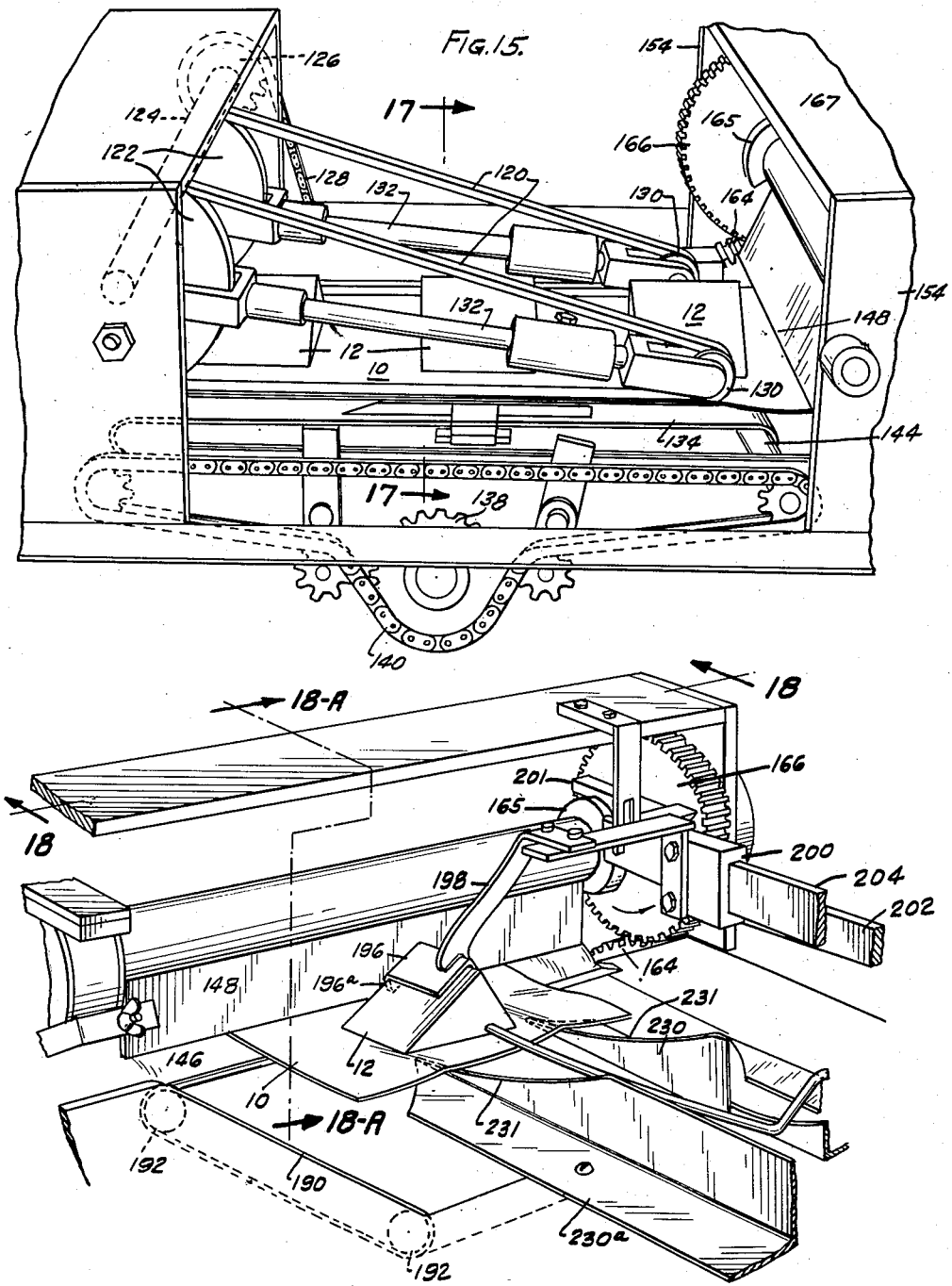

Sept. 29, 1959 D. J. PAGE ET AL 2,906,069
APPARATUS AND METHOD FOR WRAPPING PACKAGES
Filed Dec. 20, 1955 14 Sheets-Sheet 7
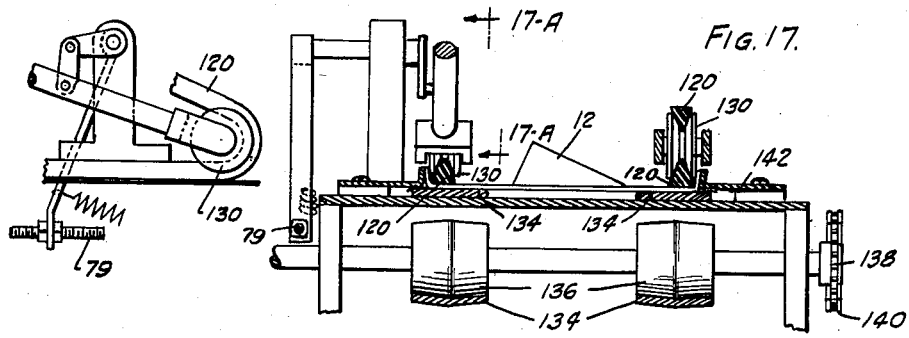
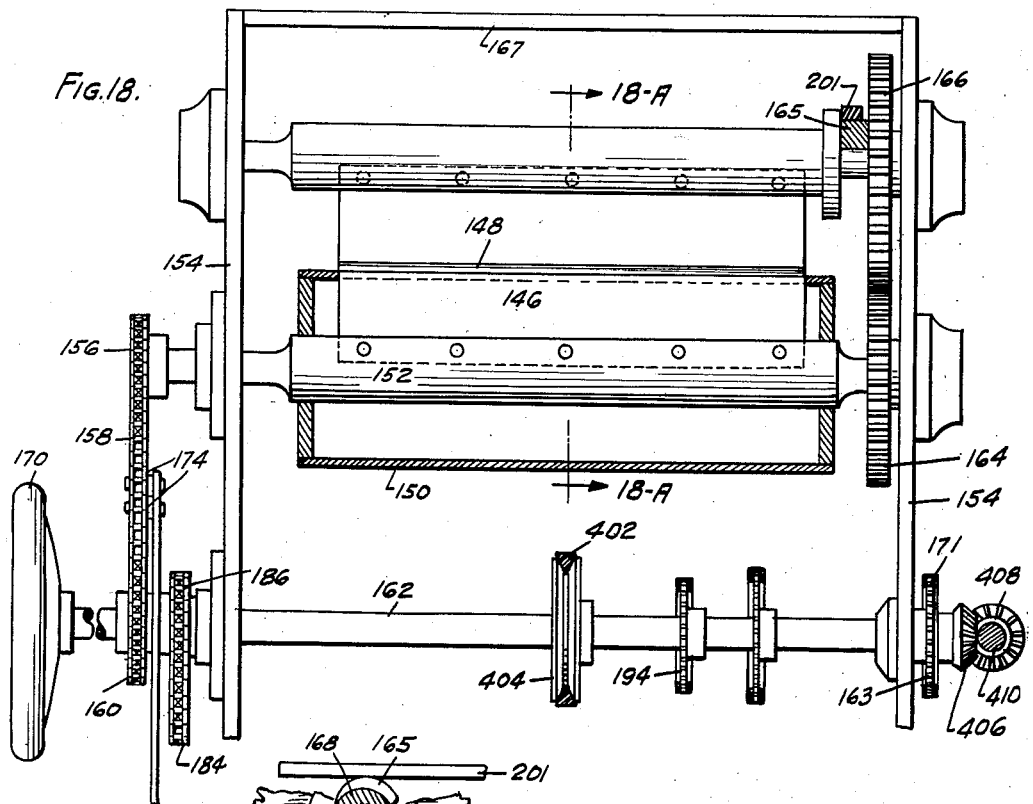
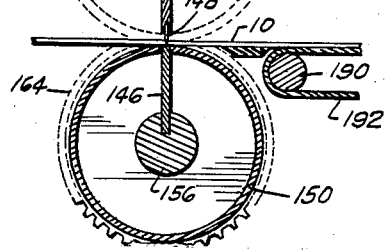
INVENTORS
DONALD J. PAGE
WILLIAM H. LUCAS
BY Harry H. Hitzeman
ATTORNEY

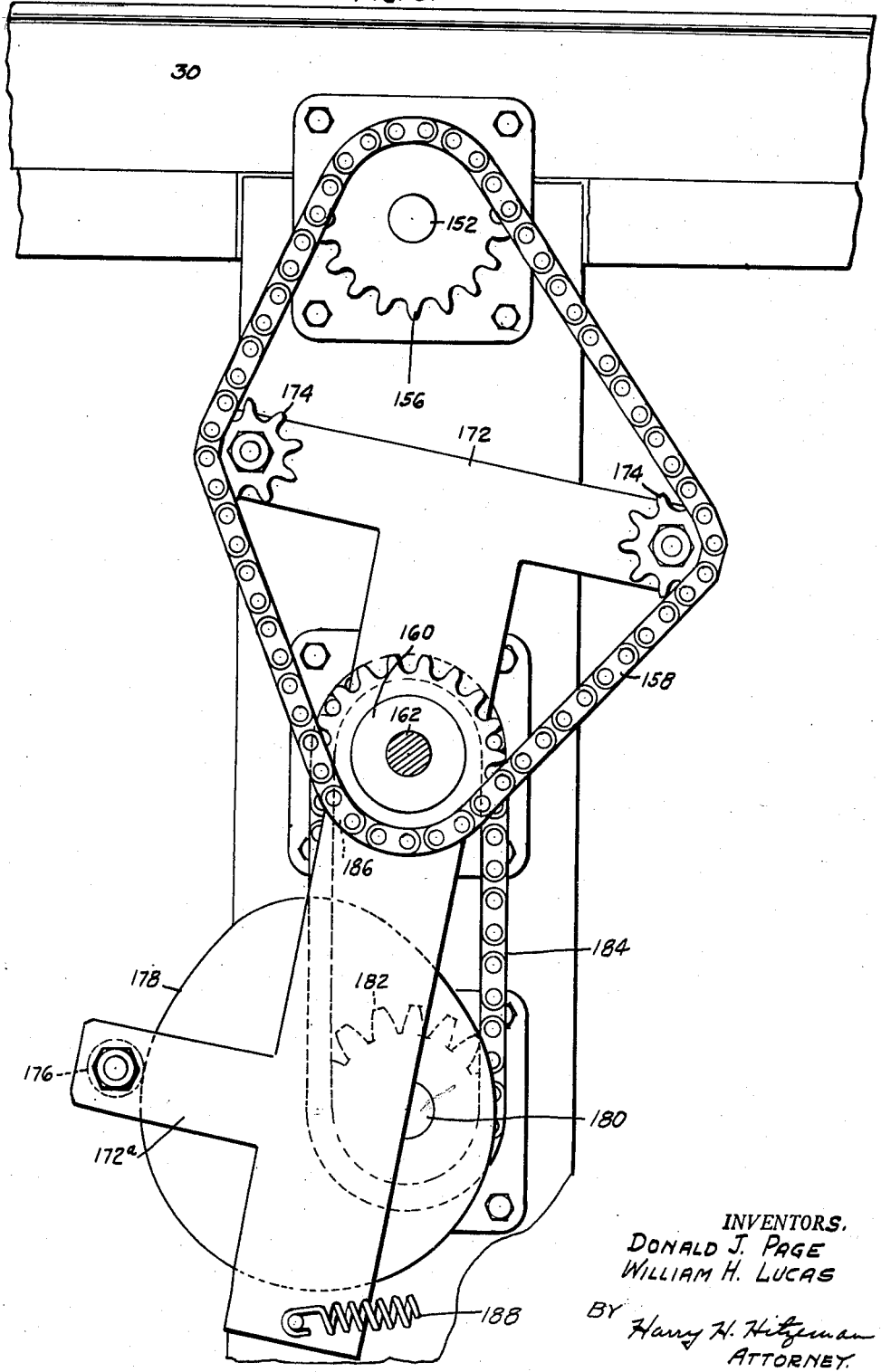

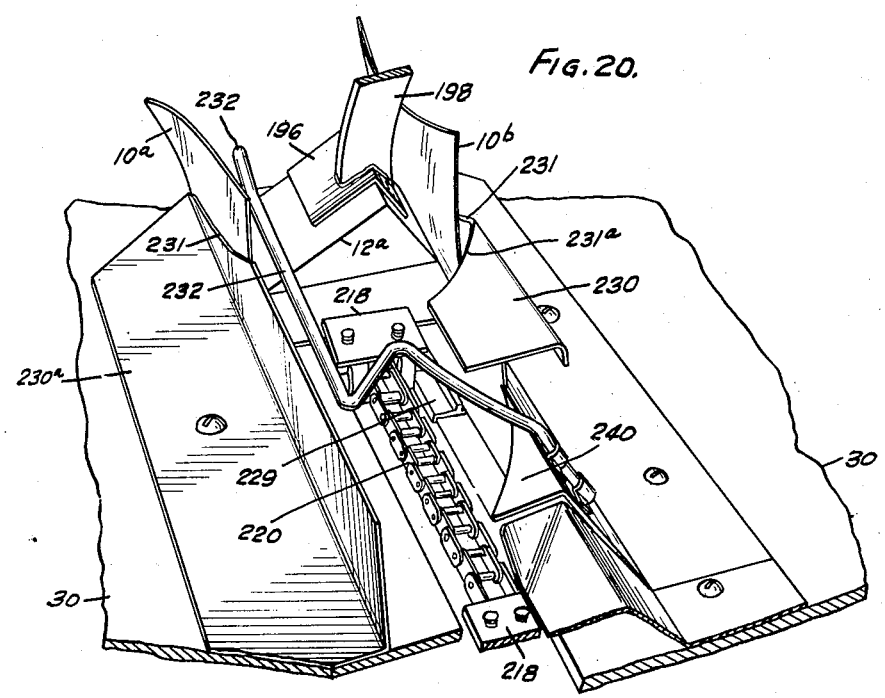
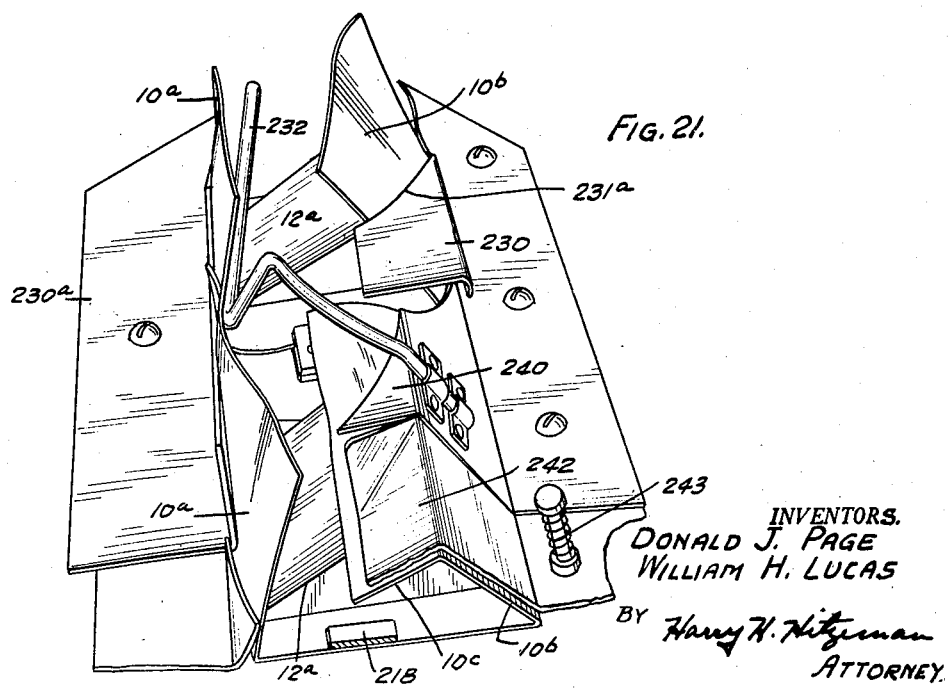

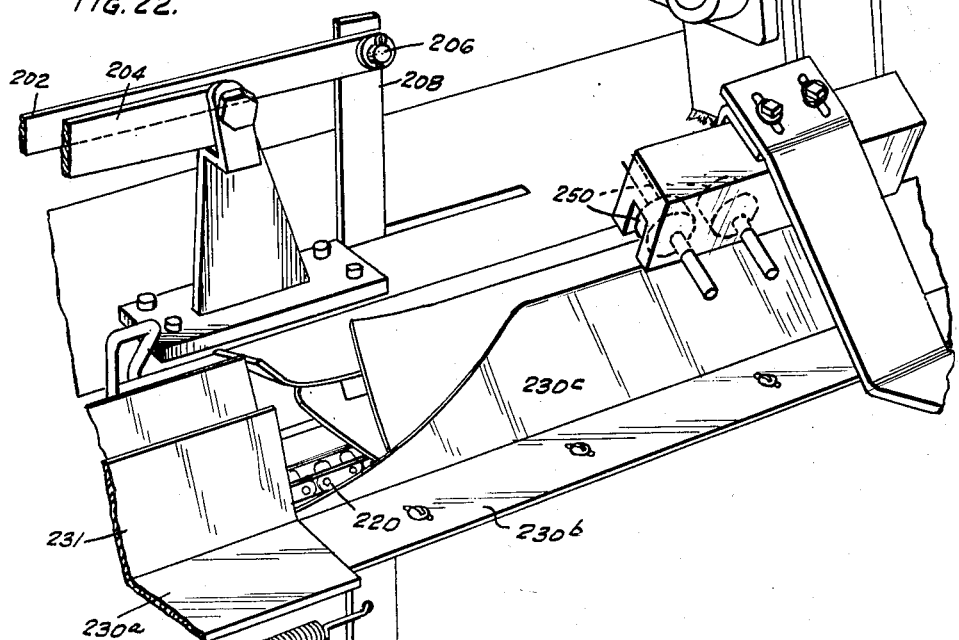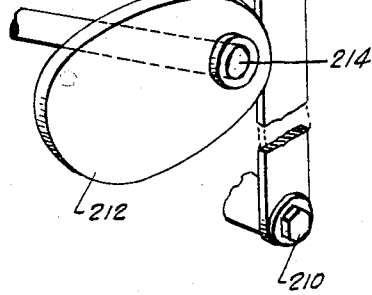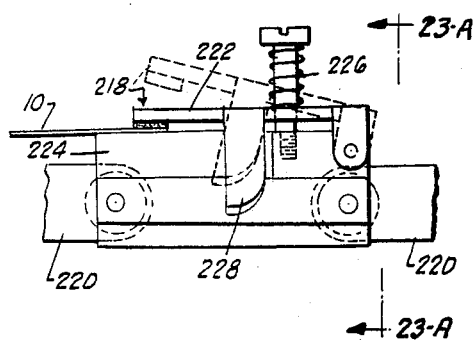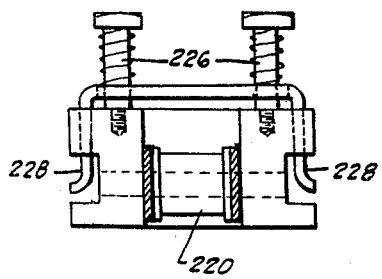

Sept. 29, 1959　　　D. J. PAGE ET AL　　　2,906,069
APPARATUS AND METHOD FOR WRAPPING PACKAGES
Filed Dec. 20, 1955　　　　　　　　　　　　14 Sheets-Sheet 11

INVENTORS.
DONALD J. PAGE
WILLIAM H. LUCAS
By Harry N. Hitzeman
ATTORNEY.

Sept. 29, 1959   D. J. PAGE ET AL   2,906,069
APPARATUS AND METHOD FOR WRAPPING PACKAGES
Filed Dec. 20, 1955   14 Sheets-Sheet 12
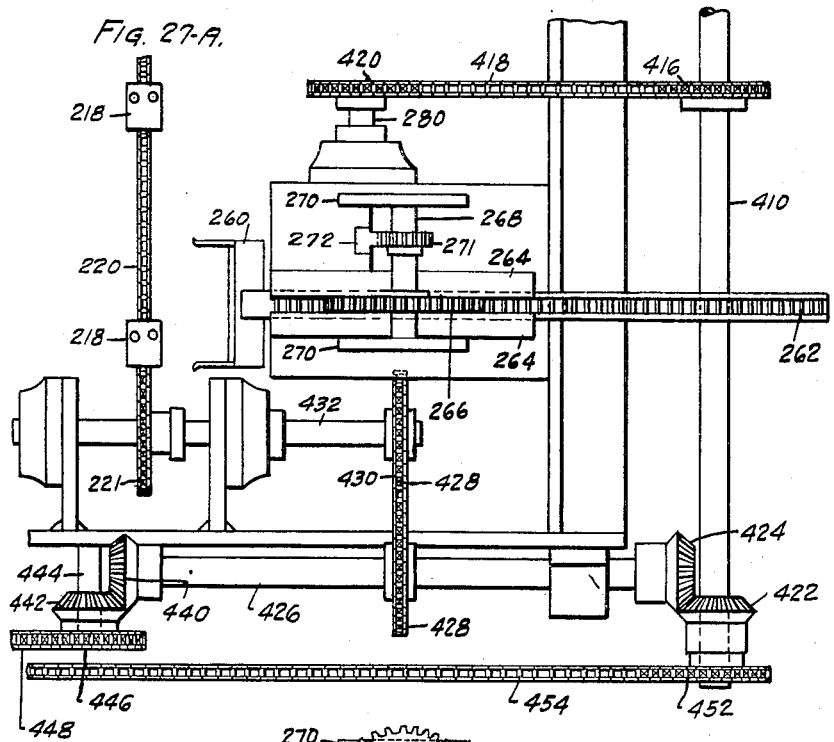
FIG. 27-A.
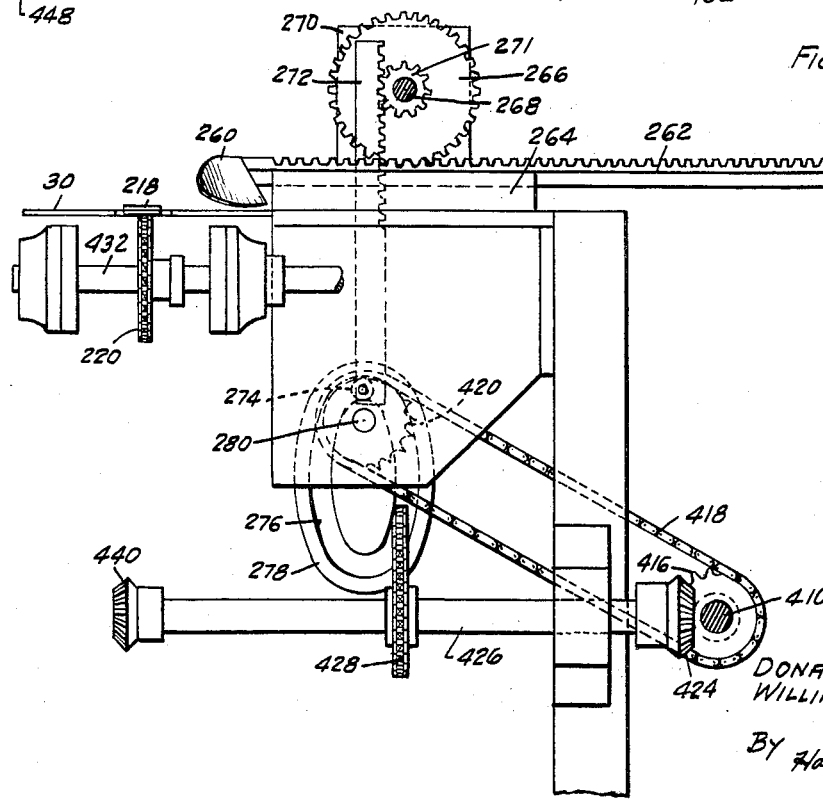
FIG. 26.
INVENTOR.
DONALD J. PAGE
WILLIAM H. LUCAS
BY Harry H. Hitzeman
ATTORNEY.

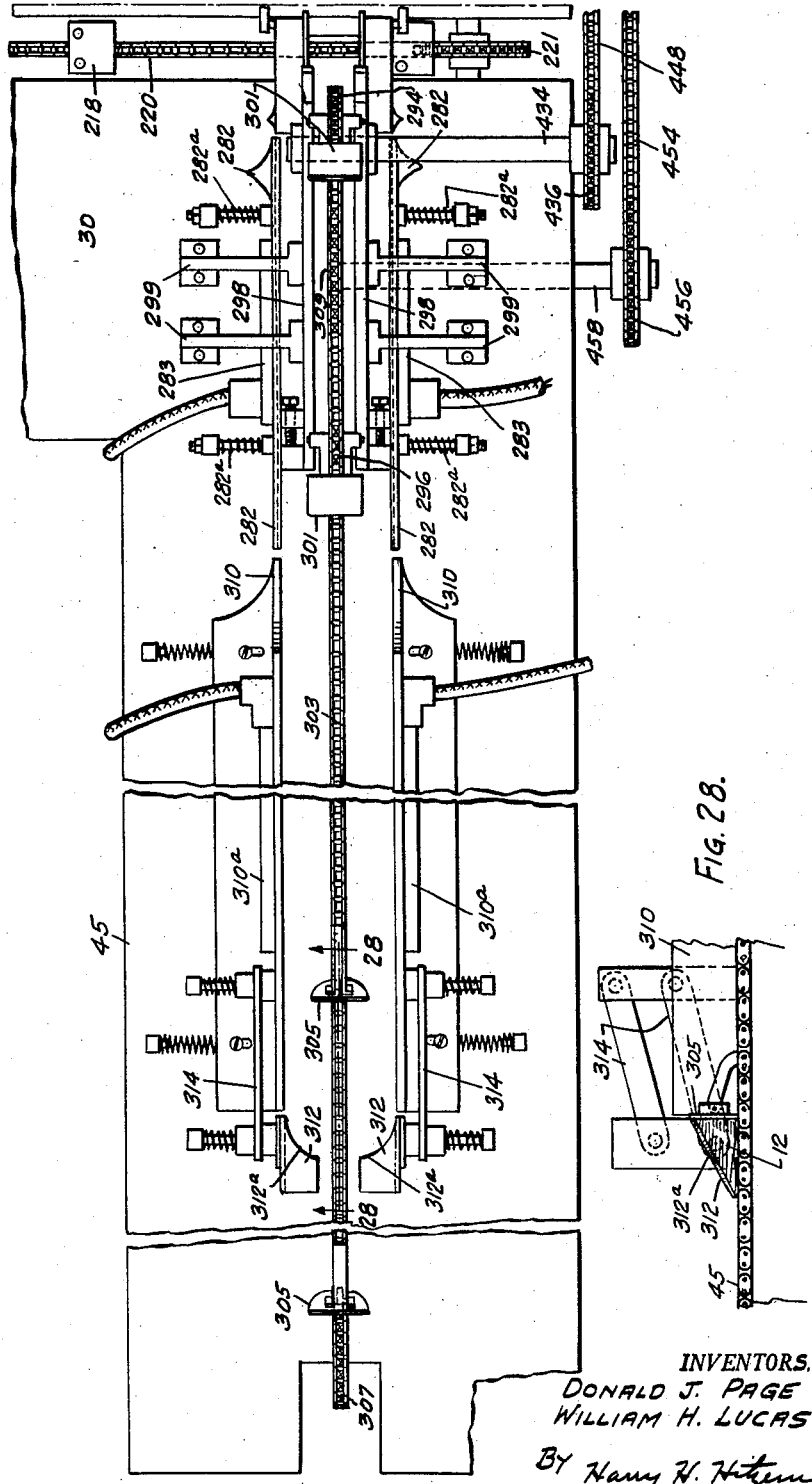

Sept. 29, 1959 D. J. PAGE ET AL 2,906,069
APPARATUS AND METHOD FOR WRAPPING PACKAGES
Filed Dec. 20, 1955 14 Sheets-Sheet 14
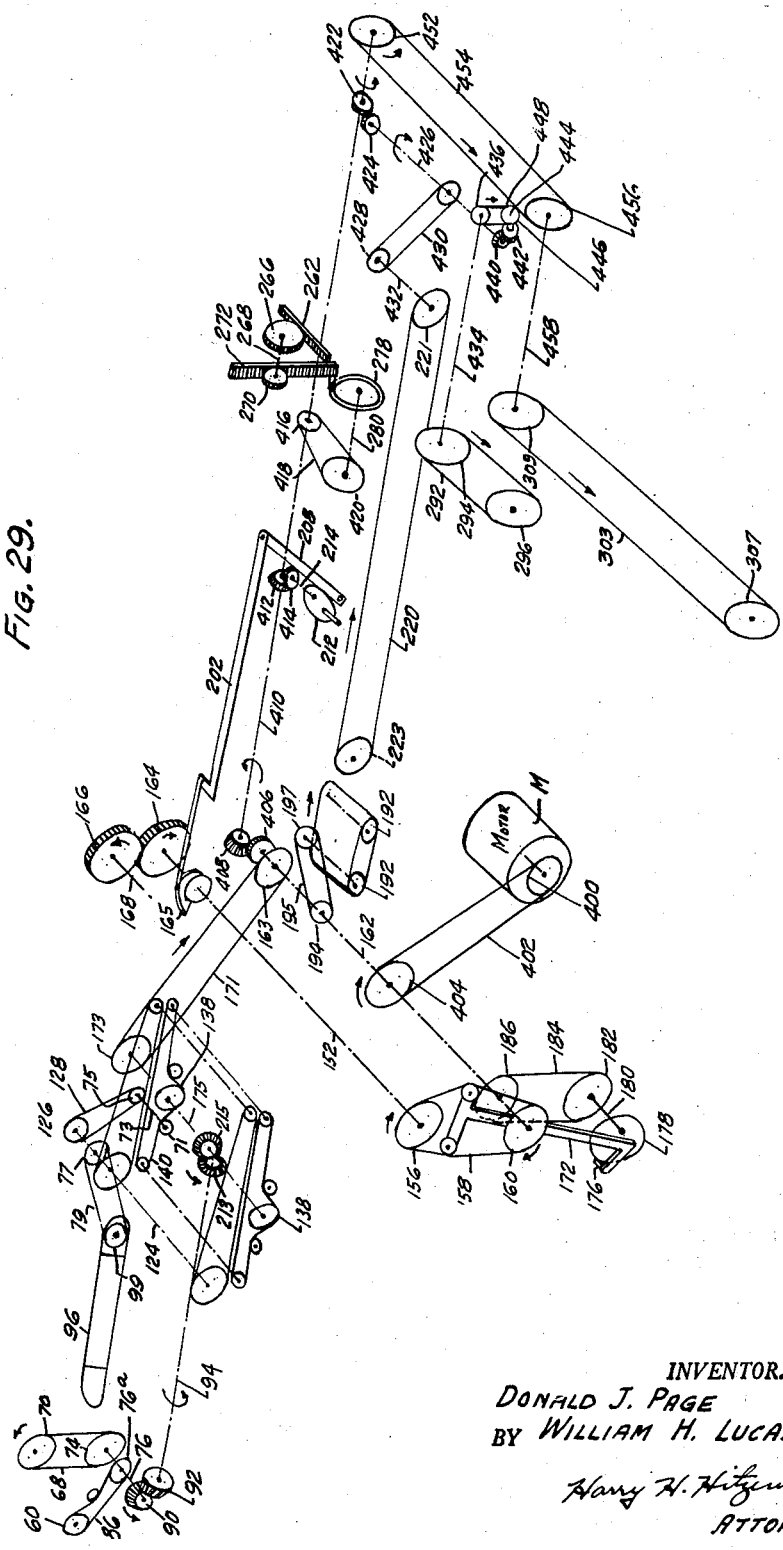
INVENTORS.
DONALD J. PAGE
BY WILLIAM H. LUCAS
Harry H. Hitzeman
ATTORNEY United States Patent Office 2,906,069
Patented Sept. 29, 1959

2,906,069

APPARATUS AND METHOD FOR WRAPPING PACKAGES

Donald J. Page and William H. Lucas, Green Bay, Wis.

Application December 20, 1955, Serial No. 554,216

16 Claims. (Cl. 53—33)

Our invention relates to an improved product package, the process of wrapping the package, and automatic apparatus for carrying out the process.

Our invention relates more particularly to the process of wrapping a wedge-shaped object such as cheese or similar product, and an automatic machine for drawing wrapping material such as metal foil or other heat-sealing material from a roll, moving it forward on a horizontal table, receiving blocks of cheese or other objects thereon, then moving the cheese or object forward on the wrapping material, cutting the material into sheets of the proper size, and then by the use of various formers and plows, folding the wrapping material about the object and heat-sealing the same to deliver at the end of the machine a wrapped and sealed package ready for packing into boxes and shipping to the various sales outlets.

Our invention contemplates in a machine of the type described a completely automatic continuously moving conveying system which carries the object forward on the strip of wrapping material, carries the sheets of wrapping material forward after they have been cut to desired length, carries the sheets forward through several folding steps, and transfers partially wrapped packages at right angles to a synchronized conveyor which has formers and heat-sealing equipment associated therewith for folding the material on parallel sides of the packages and heat-seals the same during their movement through the machine. For this purpose, we have developed a synchronized drive for all moving parts, operating in timed relation and being driven from a single source of power.

Another feature of the invention resides in the construction and operation of the transfer mechanism which receives a partially wrapped package and moves it forward at right angles to accomplish the folding and sealing of the sides of the package for delivery at the end of the machine.

The novel package which we produce is wedge-shaped and especially adapted for cheese since this shape has particular eye appeal to the purchasing public. While cheese has been wrapped in wedge-shaped packages before, it has always been done by hand and has lacked an important feature of the present package, i.e., a completely enclosed heat-sealed package which includes a heat seal of the wrapping material across the front sloping wall of the package, a heat seal over each entire side wall, and a heat seal of the overlapping ears of the side walls.

For a more comprehensive and detailed explanation of the package, the process of wrapping and the mechanism involved, reference is had to the following description and accompanying drawings, upon which:

Fig. 1 is a perspective view of the end of a continuous strip of wrapping material, showing wedge-shaped pieces of cheese or other product located upon the same;

Fig. 2 is a perspective view showing a sheet of wrapping material of the required size at the first step in folding the sheet about the wedge;

Fig. 3 is a similar perspective view showing the second step in the folding of the sheet about the block;

Fig. 4 is a similar perspective view showing the third step;

Fig. 5 is a similar perspective view showing the fourth step where the corners are started in the tucking operation;

Fig. 6 is a similar perspective view showing the tucking operation completed;

Fig. 7 is a perspective view illustrating the next step which includes the folding down of the parallel edges of the sheet around the block;

Fig. 8 is a similar perspective view showing the next step in the process, which is the folding up of the two ends of the sheet;

Fig. 9 is a similar perspective view showing the final step in the completion of the package, which is the pressing down against the the front face of the block of the ears which extend forward in Fig. 8;

Fig. 10 is a generally diagrammatic plan view with certain mechanism covers or shrouds broken into section, showing one type of machine for carrying out our improved method;

Fig. 11 is a generally diagrammatic side view of the same machine, this view also having covers broken into section to more clearly show other parts;

Fig. 12 is a fragmentary side elevational view at the front end of the machine showing the roll of wrapping material and roll of slip sheet material, parts being broken into section to more clearly show other parts;

Fig. 13 is a side perspective view showing generally the front end of the machine and a portion of the conveying mechanism for the blocks of cheese or other material to be wrapped;

Fig. 14 is a fragmentary cross-sectional view of the conveying mechanism taken generally on the line 14—14 of Fig. 13;

Fig. 15 is a fragmentary side perspective view of the wrapping material pulling mechanism shown adjacent the cutter blade which separates the same into sheets of the proper dimension;

Fig. 16 is a fragmentary side perspective view showing the mechanism for operating the cutter blade and the individual block advancing gripper adjacent thereto;

Fig. 17 is a cross-sectional view through the pull roll mechanism taken generally on the line 17—17 of Fig. 15;

Figure 24:
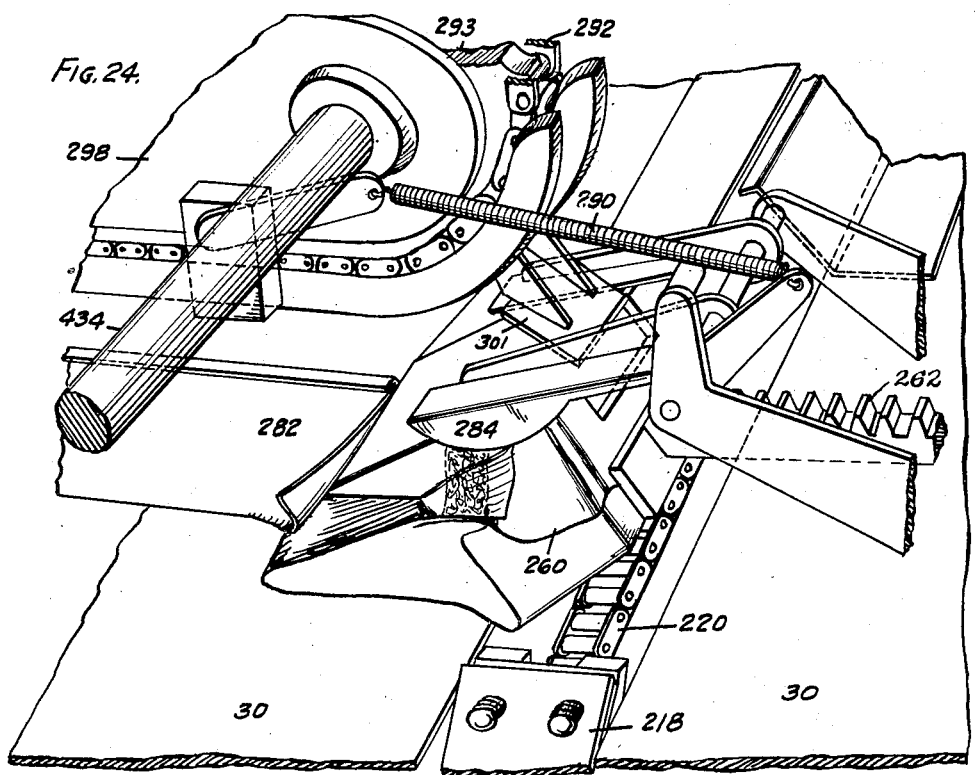
Figure 25:
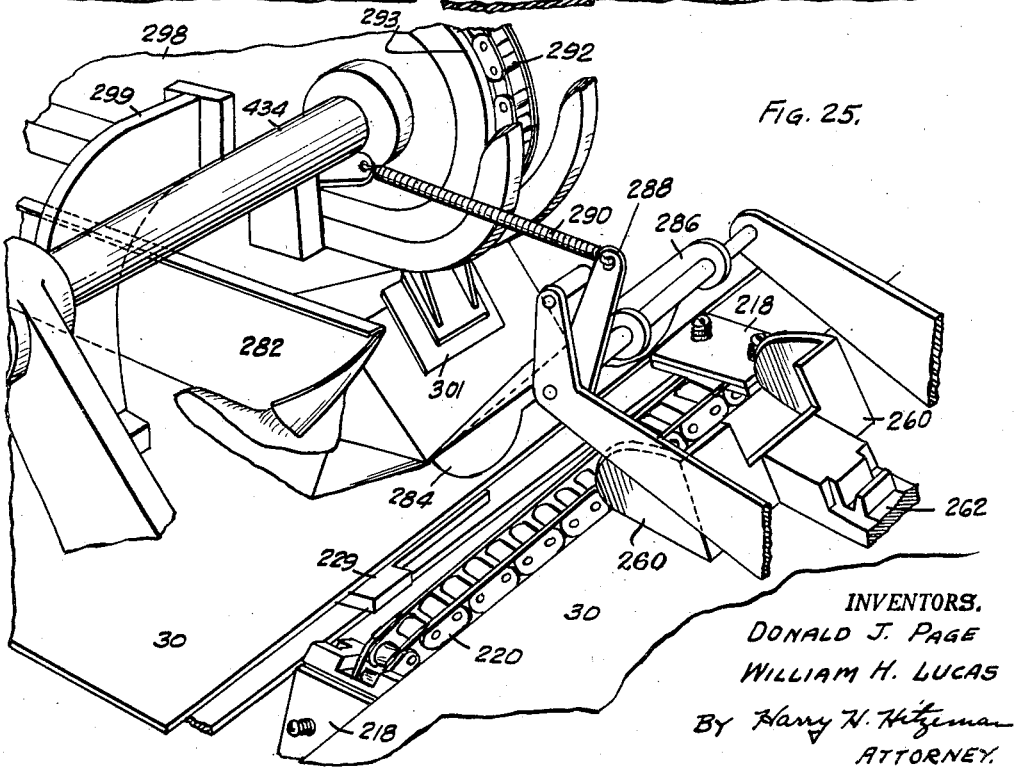

Fig. 17-A is a fragmentary view showing the release mechanism for the pull roll belts;

Fig. 18 is a vertical sectional view through the knife and anvil mechanism taken generally on the line 18—18 of Fig. 16;

Fig. 18-A is a fragmentary sectional view of the same mechanism taken generally on the line 18a—18a of Fig. 18;

Fig. 19 is a fragmentary side elevational view of the knife driving mechanism;

Fig. 20 is a top perspective view showing the plows and formers for turning the sheet of wrapping material upwardly in the first forming operation;

Fig. 21 is a similar top perspective view showing the sheet with a wedge-shaped object thereon being drawn forward through the same, and showing the manner in which the right side of the wrapping material is bent forward at an angle against the oblique wall of the object to be wrapped;

Fig. 22 is a top perspective view showing the sealing of the triangularly shaped tube and the heat-sealing mechanism associated therewith for effecting the heat seal of the tube;

Fig. 23 is a fragmentary side elevational view of one of the sheet gripping mechanisms;

Fig. 23-A is a cross-sectional view thereof taken generally on the line 23a—23a of Fig. 23;

Fig. 24 is a fragmentary perspective view of the transfer mechanism for moving the triangularly shaped tube and object at right angles from the longitudinal conveyor;

Fig. 25 is a similar view thereof with the parts in changed position and showing a partially wrapped block being moved at right angles by an upper conveyor mechanism;

Fig. 26 is a sectional view at the right angle transfer mechanism with the side paneling of the frame removed, and taken generally on the line 26—26 of Fig. 10;

Fig. 27-A is a plan view of the transfer mechanism and drives shown generally in Fig. 26;

Fig. 27-B is a fragmentary plan view of the part of the machine extending to the left from the mechanism shown in Fig. 27-A;

Fig. 28 is a cross-sectional view taken on the lines 28—28 of Fig. 27-B showing the formers or plows for folding over the ears of the side edges in the last sealing operation; and Fig. 29 is a diagrammatic view illustrating the synchronous drive from a single source for the entire operating parts of the machine.

The construction of the package, as best illustrated in Figs. 1 to 9, shows the end of a continuous strip of wrapping material 10 which has wedge-shaped blocks of cheese or other objects 12 positioned thereon in spaced relation. The sheet of wrapping material is cut upon the dot-dash line 14, and in the embodiment of the invention illustrated it is approximately 10½ inches long and 6¾ inches wide. The wrapping material which we prefer to employ is a two-ply material consisting of an outer layer of metal foil and an inner layer of heat-sealing material such as cellophane or other thermoplastic material.

As will presently be described in connection with the operation of the machine which we employ, after the sheets are cut, the back wall 16 of the sheet 10 is folded up against the back wall 18 of the block to be wrapped. During this same operation, the front wall 20 of the sheet is folded up to a vertical position. The next step in the formation of the package is to fold a portion 16a of the wall 16 down over the front wall 22 of the block 12, as shown in Fig. 3. After this fold has been made, the front wall 20 of the sheet is folded down over a portion of the wall 16a, and the edges of these two walls are heat-sealed together throughout the area 22 indicated in Fig. 4 by elongated stippling 21. This forms an elongated tube.

The next step in the folding of the sheet about the block 12 consists in tucking in the upper corners 16b of the extended ends of the tubular wall 16a and the wall 16. This is illustrated in Figs. 5 and 6, Fig. 5 showing the beginning of the tucking operation, and Fig. 6 showing the operation completed.

The next step consists of the tucking in of the extended ends 20a of the front wall 20. In this condition of the package, as best shown in Fig. 7, the two extended ends of the base portion of the sheet are in a flattened condition, and shaped to form the trapezoids 24. During the forward movement through formers 282 (see Fig. 27-B) the ends are heat-sealed. The trapezoidally shaped portions 24 are then folded up and heat-sealed across the parallel ends of the package as indicated by the elongated stippling 24a in Fig. 8. In this condition the block is moved forward again and the ear portions 24b are folded down over the front wall 22 of the wedge-shaped package, the package is completely wrapped, and the wrapping material is heat-sealed throughout.

One type of machine which we propose for carrying out the wrapping of a package of the type described may include a horizontally disposed table 30 which is provided at its end 32 with supports 34 for a roll of wrapping material 36, a conveyor mechanism 38 for moving the objects 12 to be wrapped forward in spaced relation, a wrapping material pulling mechanism 40, a series of formers, plows and heat-sealers 42 for forming a tubular wrap about the objects 12, a transfer mechanism 44 for advancing the partially wrapped packages at right angles, and formers and a conveyor system 46 for delivering the wrapped and sealed packages at the end 48 of the machine.

Referring now to Fig. 12, we have shown a roll of wrapping material 36 which is mounted upon spaced vertical supports 34, each roll including a liner or slip sheet 36a spaced between the wrapping material 36. The slip sheet material, as the roll is unwound, is wound upon an accumulator roll 60 at the end of the machine, and the wrapping material is trained over a dancer roll 62 and fed over idler rolls 64 between the puller rolls 66. The rubber covered pulling roll is driven by a chain drive 68 to a sprocket 70 on the roll shaft 72 from a sprocket 74 on a drive shaft 76. Means for releasing the friction drive of the wrapping material may include a handle 78 which carries a split shaft 80 that may be rotated to engage one of the side brackets 82 that carries the idler roll 67, moving it downwardly from engagement with the rubber covered roll 66 against the tension of spring 84. The handle also moves a link 74 which raises rollers 130 and V-belt 120 (later described) to prevent their pulling on the material.

The accumulator roll 60 is driven by a friction belt 86 from a pulley on shaft 76, the same being also provided with a slack take-up mechanism 88. The drive for shaft 76 is derived by means of the bevel gears 90 and 92 mounted on the shaft 76 and on a longitudinal drive shaft 94 respectively.

As best shown in Fig. 13, the sheet of wrapping material 10 is pulled from the roll 36, the slip sheet 36a being rolled upon the roller 60 and the sheet is pulled forward on the horizontally disposed table 30 where wedge-shaped objects such as cheese may be manually placed upon the sheet. Means for properly spacing the wedge-shaped objects 12 and moving them forward in spaced relation may include a vertically disposed conveyor chain 96 which is mounted for guidance between a pair of parallel rails 98, the chain being trained below the lower rail 98 and above the upper similar rail 98. A drive for the same is obtained from sprocket 99, the opposite end having a guide shoe 101 about which the chain runs.

At spaced points in the linkage of the chain 23 we provide a bracket 100 which carries a pivot 102 that supports a product locator arm 104. Each of the arms 104 carries a positioning bar 106, the bars 106 being mounted by means of a thumb screw through an elongated slot 108 in the arm 104. Thus for the purpose of properly positioning the wedge-shaped objects 12, the bar, as best shown in Fig. 14, is positioned at an angle so the operator can place the wedge-shaped object on the sheet with one of the parallel edges in front of the arm 104 and the back oblique edge resting against the bar 106.

The bracket 100 has a U-shaped groove 103 in the bottom of the same which rides upon a guide rail 110 rigidly fastened to the frame of the machine, the frame also carrying a support bar 112 adjacent the edge of the table 30. The arms 104, when they reach the forward end of the conveyor frame 114, are guided upwardly and outwardly by means of a third guide rail 116 so that they travel back to the front end of the table in an upwardly inclined position and settle down to a horizontal position when they start forward on the table.

The sheet of wrapping material 10 and the spaced objects 12 thereon are pulled forward on the horizontal table 30 by a pair of V-belts 120 which are driven by a pair of pulleys 122 mounted upon a shaft 124. The shaft 124 is provided at the back end of the machine (see Fig. 15) with a sprocket 126 driven by a chain 128. The V-belts 120 are trained about a pair of friction rollers 130 which lay by gravity on top of the sheet 10, being suitably supported from the pulley supporting brackets by means of adjustable extension rods 132. A pair of friction belts 134 (see Fig. 16) are rotated below the V-belts 120 on top of the table 30. These belts are driven by a pair of pulleys 136 which are driven by means of a sprocket 138 which has the chain 140 trained about the same. Suitable idler sprockets are provided to maintain tautness in the belts 134.

In order to direct the sheet of wrapping material and product to the cut-off knife, we place a pair of guide members 142 upon opposite sides of the V-belts 120 so that the edges of the sheet 10 are turned up as shown to effect a certain rigidity to the sheet as it passes from the edge of the roller or idler shaft 144 to the anvil roller 146 beneath the knife blade 148.

As best shown in Figs. 17a and 18a, the anvil 146 is mounted in a roll 150 that is supported by a shaft 152 mounted in suitable bearings in the vertical side frame members 154. The shaft 152 has a sprocket 156 thereon connected by a chain 158 to a sprocket 160 on a cross-shaft 162. The shaft 152 also has a face gear 164 thereon which meshes with a similar face gear 166 on the knife shaft 168. This shaft is also supported by suitable bearings in the vertical frame members 154. A cross-bar 167 connects the side members 154. The shaft 162 has a hand wheel 170 thereon for manual operation of the entire mechanism when desired.

In order that the product may pass under the knife at the proper time, we slow down the rotation of the knife blade 148 during a part of its rotary movement and speed it up again for the sheet-cutting action. This is done by means of an oscillating T-bracket 172 mounted on the shaft 162 and carrying a pair of idler sprockets 174 at the ends of the T. The lower end of the T-bracket has an arm 172a which carries a cam follower roller 176 that rides on the face of the cam 178. The cam 178 is mounted on a stub shaft 180 that has a sprocket wheel 182 thereon driven by a chain 184 from a similar sprocket 186 on the shaft 162. A compression spring 188 attached to the lower end of the T-member normally keeps the follower roll 176 in contact with the face of the cam 178.

After the object 12 resting on the strip 10 has passed beneath the knife and the sheet has been cut off, the sheet is carried forward on a speed-up conveyor belt 190. This belt is trained about a pair of rollers 192 which are driven from a sprocket 194 and chain from the shaft 162.

After the sheet and the object 12 have passed under the knife 148, the object is grasped by a triangularly shaped guide 196 that has a back edge 196a which moves down over the top of the object 12 to be capable of moving the same forward. The guide 196 is carried by an arm 198 which is mounted on a bracket 200. The bracket 200 has an arm 201 extending back from the same and riding upon a cam member 165 on the knife shaft adjacent the gear 166. The cam is provided with a rise portion which, as the cam 165 rotates, raises the guide 196 so that the object 12 may pass below the shoulder 196a before the guide is dropped over the top of the object.

The bracket 200 is mounted for horizontal reciprocation upon a rail 204 and is provided with a connecting rod 202 which is pivotally fastened at 206 to a vertically swinging arm 208. The arm 208 is mounted at its lower end on a pivot 210 and has an edge riding against an elongated face cam 212 mounted on shaft 214. As the cam 212 is rotated, the connecting rod 202 pulls the bracket 200 and guide 196 forward to move the object and sheet into the first plows or forming members. A coiled spring 216 holds the rocker arm 208 at all times in contact with the cam 212.

The guide 196, in the operation just described, moves the sheet 10 and product 12 forward (see Fig. 20) until the edge of the sheet 10 is grasped by a gripper member 218. The gripper members 218 are positioned in spaced relation in the conveyor chain 220 which carries the sheet and product forward through the various plows and formers until they reach the transfer position where they are moved at right angles. Each of the gripper members, see Figs. 23 and 23A, consist of a pivoted arm 222 normally held against a platform 224 by coiled spring members 226. The platforms 224 are connected to the links of the chain 220. Each of the pivoted arms 222 has a pair of downwardly turned ear members 228 which have an outwardly turned rounded lower edge which, later in the sequence of operation, rides up over cam members positioned in their path so that they are raised to the dotted line position shown in Fig. 23, thus releasing them from holding the sheet of wrapping material 10.

As best seen in Fig. 16, the folding plates 230 and 230a are mounted on table 30, the plates having the vertically directed arcuate edge portions 231 which, as the sheet is moved forward by the gripper member, fold the front and the back edges of the sheet up into a vertical position, see Fig. 20. It will further be noted that the extended rod 232 holds the upturned vertical edge 10a of the sheet erect while the horizontally turned edge 231a of the former 230 directs the edge 10b of the sheet in a horizontal plane. Continued forward movement of the sheet 10 and product 12 brings the horizontally directed portion 10b of the sheet below the angularly disposed plows 240 and 242, thereby directing a portion 10c of the edge 10b up over the oblique side of the object 12 and down along the sloping upper edge 12a of the same.

Referring now to Fig. 22 and the former 230b which is aligned with the former 230a, the same is provided with an inclined sloping plow member 230c which is adapted to fold over the vertical edge 10a of the sheet 10 so that the same overlaps a portion of the folded-over edge 10c. In this position the sheet has been folded into a triangularly shaped tube with overlapping edges, and it now passes forward beneath suitable heat-sealing rollers 250 (see Fig. 22), where a heat seal is applied over the portions of the overlapping edges of the sheet. As products such as cheese are sometimes cut as much as ¼ inch out of size, all of the folding plates work on the breather type system, or in other words they are somewhat flexibly mounted so that they may work in and out and up and down. Such fastenings may include spring type mountings as shown at 243.

The tubularly shaped package enclosing the object 12 is now moved forward in the machine by the gripper members 218 connected to conveyor chain 220 until they arrive at the transfer station where the partially wrapped packages are moved at 90 degrees. This movement is accomplished by means of a plunger or ram 260 which is mounted at the end of a horizontal rack 262 in suitable guides 264. The grippers 218 release their hold on the edge of the sheet 10 as the turned-down arms 228 pass over the cam 229 mounted in their path and aligned with the chain 220.

The plunger or ram 260 moves the partially wrapped package forward, the rack 262 being driven by a face gear 266 mounted on a shaft 268 supported in a pair of side plates 270. The shaft 268 also carries a smaller gear 270 which is driven by a vertically disposed rack 272 in a vertically reciprocating motion. The end of the rack 272 carries a cam roller 274 which follows the cam track 276 in the two-way drive cam 278 mounted on shaft 280.

As the plunger 260 moves the partially wrapped package at right angles to the chain 220, the package is moved against the folding plates 282, at which time the extended edges of the wrapping material is creased, as generally shown in Figs. 24 and 25 and in Figs. 5, 6 and 7 illustrating the fold. During the movement forward to the folding plates 282, the parallel edges of the wedge-shaped object are engaged by the turned-down sides 284 of a pivotally mounted arm 286, this action tending to fold down the side edges of the sheets, see Fig. 24. The arm 286 is connected by a lever 288 and spring 290 to a stationary part of the machine so that the downward pressure against the wrapping material is yielding and only under the spring pressure provided.

Means for moving the sheet and product forward between the forming plates 282 may include a conveyor chain 292 above the same trained about a pair of sprockets 294 and 296 mounted on suitable shafts in a pair of frames 298 that are supported from the table 30 by a pair of brackets 299 connected to each of the same. The conveyor chain 292 is provided at spaced intervals with paddles 301 which, in timed sequence with the forward movement of the plunger or ram 260, swing down and forward against the oblique side of the partially completed package, see Fig. 25. At the same time a lower conveyor chain 303 provided with conveyor paddles 305, carries the package forward after it leaves the folding plates 282 to engage the arcuately shaped plow members 310 mounted on the right-angle extension 45 of the table 30.

When the partially wrapped packages leave the folding plates 282 they will be in the condition shown in Fig. 7, and will have had the creased-over sides heat-sealed by the heat sealing units 283 mounted on each of the former plates 282. The plates 282 are yieldingly mounted by means of the spring members 282a. The plow members 310, which are also provided with heat-sealing units 310a, serve to turn up the flattened extended trapezoidally shaped edges 24 of the package to the position shown in Fig. 8 of the drawings.

The package now moves forward between the extended rails of the plow members 310 and the side walls are effectively heat-sealed forward from the package, leaving only the ears 24b extending forward from the package to be flattened down and sealed. This is accomplished by means of a pair of folding plate members 312. Each of the plates 312 has a curved forward edge 312a for engaging the up-turned ears of the packaging material and turning them down on the face of the package, and as the package is moved forward beneath the sloping wall of the folding plate, it is raised on a pair of pivoted link members 314, and as the completed package passes beyond the plates, the same drop into place to be ready for the next package that is coming. The chain 303 with its paddles 305 thus moves the completed package forward to the packing end of the table 45. The chain 303 is mounted on a pair of sprockets 307 and 309 which are driven in timed relation with the balance of the machine. The rails 310a as well as the forming plates 312 are spring loaded, as shown, to permit for variation in product size.

In Fig. 29 we have shown a schematic synchronous drive for the machine above described. The drive may include a single source of power such as the motor M which carries a pulley 400 for driving a belt 402. The belt 402 is trained around a pulley 404 on the shaft 162.

The shaft 162 drives the sprockets 186 and 160. The sprocket 186 drives chain 184 and sprocket 182. Sprocket 182 is mounted on shaft 180 which carries the cam 178. Sprocket 160 drives the sprocket 156 by means of chain 158. Sprocket 156 is mounted on shaft 152 which carries the cam 165 and the face gear 164 for the anvil, and which gear also drives the face gear 166 that rotates the shaft 168 upon which the knife is mounted.

The shaft 162 also drives the speed-up rollers 192 by means of a sprocket 194 and chain 195 to a sprocket 197 on the shaft of roller 192. Shaft 162 also carries a sprocket 163 which drives a chain 171 trained over a sprocket 173 on the shaft 175 that carries the sets of sprockets 138. The drive for the V-belts 120 is secured from the chain 140 over a sprocket 71 mounted on a stub shaft 73. This carries a sprocket 75 that drives the chain 128 over sprocket 126 mounted on shaft 124. A sprocket 77 mounted on shaft 124 drives a chain 79 that is connected to the sprocket 99 which drives the conveyor 96.

The drive for the material advancing mechanism from the roll 36 may include a pair of bevel gears 213 and 215, the latter mounted on the shaft 175 and the former at the end of shaft 94. The gear 92 at the opposite end of shaft 94 drives the bevel gear 90 on shaft 76; the sprocket 74 on shaft 76 drives the sprocket 72 by means of the chain 68. In addition, the belt 86 to the slip sheet take-up roll 60 is driven by the pulley 76a on the shaft 76.

The drive forward from the shaft 162 is accomplished by means of a pair of bevel gears 406 on shaft 162 and 408 on shaft 410. The shaft 410 extends forward to the end of the machine and carries a bevel gear 412 which meshes with a similar bevel gear 414 on the shaft 214 that drives the cam 212. This is a cam for operating the oscillating lever 208. Further forward the shaft 410 carries a sprocket 416 which drives a chain 418 trained over a sprocket 420 on the shaft 280 for the cam member 278. The cam operates the vertically reciprocating rack 272 which drives the gear 270 and shaft 268. The face gear 266 on shaft 268 drives the horizontally reciprocating rack 262 of the plunger or ram 260.

Adjacent the end of shaft 410 a bevel gear 422 drives a bevel gear 424 on shaft 426. A sprocket 428 on shaft 426 drives the sprocket 428 by means of a chain 430. The sprocket 428 is keyed to the shaft 432 which has the sprocket 221 thereon over which the conveyor chain 220 is trained. The conveyor chain 220 is trained over an idler sprocket 223 adjacent the conveyor member 190.

The upper conveyor chain 292 at the right angle transfer is driven by means of a sprocket 294 mounted on a shaft 434 which has a sprocket 436 at the end of the same. The support bars 298 also carry the idler sprocket 296 about which the chain 292 is trained. Shaft 426 has a bevel gear 440 which meshes with a bevel gear 442 on a stub shaft 444 that carries a sprocket wheel 446 at the end of the same. The sprocket wheel 446 has a chain 448 trained about the same and the sprocket wheel 436 of the shaft 434.

For driving the final conveyor on the table at the discharge end of the machine, we provide a sprocket 452 on the end of shaft 410. The sprocket drives a chain 454 that is trained about a similar sprocket 456 mounted on the shaft 458. The shaft 458 carries the sprocket 309 about which the chain 303 which carries the paddles 305 is trained, the chain passing over an idler sprocket 307 at the discharge end of the machine.

From the above and foregoing description it can be seen that we have provided a highly efficient and accurately operating mechanism for mechanically wrapping wedges of cheese or other similar wedge-shaped objects. Throughout the entire machine provision has been made for slight variation in product size, as witness the various spring mounting of the guides, formers and plows.

Summarizing the operation of the machine, it will be clear from the foregoing description that the wrapping material is pulled from the feed roll 36 and is moved forward on the horizontal table 30. The wrapping material moves forward over an extended length of the table 30, at which point operators place blocks of cheese or other product to be wrapped upon the material, the spacing of the same being controlled by the product locator arms 104 and their positioning bars 106. The wrapping material with the objects thereon is thus moved forward at a continuous rate of speed until the wrapping material and product pass beneath the knife 148 and over the anvil roll 150, at which position, due to the action of the guide 196, each severed sheet is moved forward at an accelerated speed and the forward edge of the sheet is grasped by a spring loaded gripper member 218. These gripper members are mounted at spaced intervals on a horizontally disposed conveyor chain and the sheet is pulled forward through the formers which fold the parallel side edges of the sheet over the block or product and heat-seal along the surface of the product, thus creating in the forward travel of the sheet and block a tubular package open at both ends.

From the description of the operation of the transfer mechanism including the plunger or ram 260, it is clear that as the partially completed package and product arrive in front of the formers 282, see Figs. 24 and 25, the grippers release their hold on the front edge of the partially completed package, and the plunger or ram 260 moves the package at right angles so that the side edges are folded down, the first folding in being done initially by the two side wings of the plunger 260, and then the formers 282 take over and produce a fold down of the side edges of the package, which results in the trapezoidally shaped fold shown in Fig. 7.

As the partially completed package is moved forward by means of the conveyor 292 with its pusher paddles 301, the plows 310 fold up these edges, and due to the heat sealing units along the sides of the rails the sides are heat-sealed, leaving only the two ears, see Fig. 8, extending forward from the package. As further described, these ears are turned down and heat-sealed against the forward face of the package by means of the former or plow members 312.

It is thus evident that we have provided a continuously operating mechanism which, according to our experimental operation, has resulted in a speed of approximately 75 to 100 packages per minute. It will further be apparent that due to the single source of power and the timed synchronous drive which is accomplished throughout by means of the chain, sprocket and gear operation, there can be no deflection in the timing of the various grasping and pulling operations which take place. The entire mechanism is thus completely automatic, and the only requirement as far as attendants is concerned is the placing of the objects to be wrapped in front of the pusher arms on the elongated table 30 at the front of the machine.

While we have illustrated and described a specific embodiment of the invention, it will be apparent to those skilled in the art that changes and modifications may be made in the exact details shown and we do not wish to be limited in any particular; rather what we desire to secure and protect by Letters Patent of the United States is:

1. A machine for wrapping a wedge-shaped object into a heat-sealed package, comprising a horizontally disposed table, a roll of wrapping material positioned at one end of said table, means for feeding said strip of material forward on said table, means for carrying said wedge-shaped objects forward thereon in spaced relation, means for cutting said strip into rectangularly shaped sheets, each sheet having a wedge-shaped object disposed medially thereon, means for folding the parallel edges of said sheet up and overlapping along the sloping front wall of said wedge-shaped object, heat-sealing means for sealing said material along said fold into a triangularly shaped tube, means for moving said triangularly shaped tube and object forward to a given point, means at said point for moving said partially completed package at right angles, means for folding down the parallel side edges of said sheet across the parallel sides of said object and heat-sealing the same thereto, and conveyor means associated therewith for moving the finished package out of said machine.

2. A machine for wrapping a wedge-shaped object into a heat-sealed package, comprising a horizontally disposed table, a roll of wrapping material positioned at one end of said table, means for feeding said strip of material forward on said table, means for carrying said wedge-shaped objects forward thereon in spaced relation, means for cutting said strip into rectangularly shaped sheets, each sheet having a wedge-shaped object disposed medially thereon, means for folding the parallel edges of said sheet up and overlapping along the sloping front wall of said wedge-shaped object, heat-sealing means for sealing said material along said fold into a triangularly shaped tube, means for moving said triangularly shaped tube and object forward to a given point, means at said point for moving said partially completed package at right angles, means for folding down the parallel side edges of said sheet across the parallel sides of said object and heat-sealing the same thereto, and conveyor means associated therewith for moving the finished package out of said machine, said cutting means including a rotating knife blade and anvil mechanism for varying the rotary speed of said knife when said sheet and object are passing between the knife blade and anvil.

3. A machine for wrapping a wedge-shaped object into a heat-sealed package, comprising a horizontally disposed table having a conveyor thereon, a roll of wrapping material positioned at one end of said table, means for feeding said strip of material forward beneath said conveyor, said conveyor having arms in spaced relation to carry said wedge-shaped objects forward thereon in spaced relation, a knife for cutting said strip into rectangularly shaped sheets, each sheet having a wedge-shaped object disposed medially thereon, formers for folding the parallel edges of said sheet up and overlapping along the sloping front wall of said wedge-shaped object, heat-sealing means for sealing said material along said fold into a triangularly shaped tube, means for moving said triangularly shaped tube and object forward to a given point, a pusher member at said point for moving said partially completed package at right angles, formers for folding down the parallel side edges of said sheet across the parallel sides of said object, and heat-sealing the same thereto, and conveyor means associated therewith for moving the finished package out of said machine.

4. A machine for wrapping a wedge-shaped object into a heat-sealed package, comprising a horizontally disposed table having a conveyor thereon, a roll of wrapping material positioned at one end of said table, means for feeding said strip of material forward beneath said conveyor, said conveyor having arms in spaced relation to carry said wedge-shaped objects forward, a rotary knife for cutting said strip into rectangularly shaped sheets, each sheet having a wedge-shaped object disposed medially thereon, said sheet and object adapted to pass forward between said knife and an anvil in a continuous movement, formers for folding the parallel edges of said sheet up and overlapping along the sloping front wall of said wedge-shaped object, heat-sealing means for sealing said material along said fold into a triangularly shaped tube, means for moving said triangularly shaped tube and object forward to a given point, a pusher member at said point for moving said partially completed package at right angles, formers for folding down the parallel side edges of said sheet across the parallel sides of said object, other formers for folding the base portions of the side edges up and heat-sealing the same thereto, and conveyor means associated therewith for moving the finished package out of said machine.

5. A machine for wrapping a wedge-shaped object into a heat-sealed package, comprising a horizontally disposed table having a conveyor thereon, a roll of wrapping material positioned at one end of said table, means for feeding said strip of material forward beneath said conveyor, said conveyor having arms in spaced relation to carry said wedge-shaped objects forward, a rotary knife for cutting said strip into rectangularly shaped sheets, each sheet having a wedge-shaped object disposed medially thereon, said sheet and object adapted to pass forward between said knife and an anvil in a continuous movement, means associated with said knife for slowing down the rotary movement thereof while said object is passing through, formers for folding the parallel edges of said sheet up and overlapping along the sloping front wall of said wedge-shaped object, heat-sealing means for sealing said material along said fold into a triangularly shaped tube, means for moving said triangularly shaped tube and object forward to a given point, a pusher member at said point for moving said partially completed package at right angles, formers for folding down the parallel side edges of said sheet across the parallel sides of said object, other formers for folding the base portions of the side edges up and heat-sealing the same thereto, and conveyor means associated therewith for moving the finished package out of said machine.

6. A machine for wrapping a triangular shaped block having parallel sides into a heat-sealed package, comprising a horizontally disposed table having a conveyor thereon, a roll of wrapping material positioned at one end of said table, means for feeding said strip of material forward beneath said conveyor, said conveyor having arms in spaced relation to carry said blocks forward on said wrapping material, a knife for cutting said strip into rectangularly shaped sheets, each sheet having a block disposed medially thereon, formers for folding the parallel edges of said sheet up and overlapping along the sloping front wall of said block, heat-sealing means for sealing said material along said fold into a triangularly shaped tube, means for moving said triangularly shaped tube and block forward to a given point, a pusher member at said point for moving said partially completed package at right angles, formers for folding down the parallel side edges of said sheet across the parallel sides of said block and heat-sealing the same thereto, and conveyor means associated therewith for moving the finished package out of said machine.

7. A machine for wrapping a triangularly shaped block having parallel sides into a heat-sealed package, comprising a horizontally disposed table having a conveyor thereon, a roll of wrapping material positioned at one end of said table, means for feeding said strip of material forward beneath said conveyor, said conveyor having arms in spaced relation to carry said blocks forward on said wrapping material, a knife for cutting said strip into rectangularly shaped sheets, each sheet having a block disposed medially thereon, formers for folding the parallel edges of said sheet up and overlapping along the sloping front wall of said block, heat-sealing means for sealing said material along said fold into a triangularly shaped tube, means for moving said triangularly shaped tube and block forward to a given point, said means including an endless conveyor having spaced spring pressed gripper members capable of grasping the forward edge of said sheet for pulling the same forward, cam means for opening said gripper members at said given point, a pusher member at said point for moving said partially completed package at right angles, formers for folding down the parallel side edges of said sheet across the parallel sides of said block and heat-sealing the same thereto, and conveyor means associated therewith for moving the finished package out of said machine.

8. A machine of the type described which includes a conveyor chain having spaced spring-pressed grippers, said grippers adapted to grasp the front edge of a rectangular sheet of wrapping material with an object to be wrapped positioned on the middle of said sheet, a group of formers and plows aligned on both sides of said conveyor chain, one of said gripper members adapted to pull said sheet and product through said formers to shape said sheet about said object into a triangularly shaped tube with one side edge of the sheet overlapping the opposite parallel edge of the same, one of said formers having a heat sealer thereon for sealing the overlapped edges of said sheet during its transit therethrough.

9. A machine of the type described which includes an endless conveyor having spaced spring-pressed grippers connected thereto, means for moving a rectangular sheet of wrapping material forward with an object to be wrapped positioned on the middle of said sheet, one of said grippers adapted to grasp the front end of the same, a group of formers and plows aligned on both sides of said conveyor, one of said gripper members adapted to pull said sheet and product through said former to shape said sheet about said object into a triangularly shaped tube with one side edge of the sheet overlapping the opposite parallel edge of the same, one of said formers having a heat sealer thereon for sealing the overlapped edges of said sheet during its transit therethrough, said gripper adapted to open and release its grasp on said tube after the same has been formed.

10. A machine of the type described which includes an endless conveyor having spaced spring-pressed grippers connected thereto, means for moving a rectangular sheet of wrapping material forward with an object to be wrapped position on the middle of said sheet, one of said grippers adapted to grasp the front end of the same, a group of formers and plows aligned on both sides of said conveyor, another of said gripper members adapted to pull said sheet and product through said formers to shape said sheet about said object into a triangularly shaped tube with one side edge of the sheet overlapping the opposite parallel edge of the same, one of said formers having a heat sealer thereon for sealing the overlapped edges of said sheet during its transit therethrough, said last named gripper adapted to open and release its grasp on said tube after the same has been formed, and other means for moving said triangularly shaped tube including said object at right angles to complete the wrapping of said object.

11. The method of wrapping a wedge-shaped object which includes the steps of placing a wedge-shaped object on a rectangular sheet of wrapping material, moving the sheet forward and folding one side of the sheet up against an oblique wall of the wedge-shaped object, folding the opposite edge of the sheet upwardly, folding the overlapping edge along the oblique side downwardly over the sloping side of the object, folding the vertical edge down to overlap this edge, applying a heat seal along the overlapped portions of the sheet to form a triangularly shaped sealed tube, tucking in the parallel side edges of the tube from the oblique side thereof, moving the partially wrapped block at right angles, folding down the overlapped portions of the tube against the parallel sides of the object, folding up the extended edges and heat-sealing the same along the parallel sides of the object.

12. The method of wrapping a wedge-shaped block which includes the steps of placing a wedge-shaped block having parallel transverse ends on its base on a moving strip of wrapping material, cutting a rectangular sheet from the strip, moving the sheet forward and folding one side of the sheet up against an oblique wall of the wedge-shaped object beyond the top of the same to provide an overlapping edge, folding the opposite edge of the sheet upwardly, folding the overlapping edge along the oblique side downwardly over and against the sloping side of the object, folding the above mentioned opposite edge forward in contact and over the above over-lapping edge, applying a heat seal along the overlapped portions of the edges of the sheet to form a triangularly shaped sealed tube, tucking in the parallel side edges of the tube from the oblique side thereof against the transverse sides of the wedge-shaped block, moving the partially wrapped block at right angles, folding down the overlapped portions of the tube extending beyond the transverse sides of the block against the parallel ends of the block, folding up the extended edges of the sheet against the ends of the block overlying the previously folded in portions of the sheet, and heat sealing the same together against the parallel ends of the block.

13. The method of wrapping a wedge-shaped block which has a rectangular base, an oblique back wall, a sloping front wall and parallel transverse side walls, which includes the steps of placing said block on its base on a moving strip of wrapping material, cutting a rectangular sheet from the strip while the block is medially disposed on the sheet, moving the sheet forward at a faster speed from a following sheet, then moving the sheet forward and folding the back edge of the sheet up against the oblique back wall and extending past the top edge of the block and down against the sloping front wall of the same, folding the forward edge of the sheet upwardly, folding the extended edge of the back side of the sheet downwardly over the front side of the block, folding the front edge back to overlap this edge portion, applying a heat seal along the overlapped portions of the sheet to form a triangularly shaped sealed tube, tucking in the parallel side edges of the tube from the oblique side thereof, moving the partially wrapped block at right angles, folding down the over-lapped portions of the tube against the parallel sides of the block, folding up the extended edges and heat sealing the same along the parallel sides of the block.

14. The method of wrapping a wedge-shaped block which has a rectangular base, an oblique back wall, a sloping front wall and parallel transverse side walls, which includes the steps of placing said block on its base on a moving strip of wrapping material, cutting a rectangular sheet from the strip while the block is medially disposed on the sheet, moving the sheet forward at a faster speed from a following sheet, then moving the sheet forward and folding the back edge of the sheet up against the oblique back wall and extending past the top edge of the block and down against the sloping front wall of the same, folding the forward edge of the sheet upwardly, folding the extended edge of the back side of the sheet downwardly over the front side of the block, folding the front edge back to overlap this edge portion, applying a heat seal along the overlapped portions of the sheet to form a triangularly shaped sealed tube, tucking in the parallel side edges of the tube from the oblique side thereof, moving the partially wrapped block at right angles, folding down the over-lapped portions of the tube against the parallel sides of the block, folding up the extended edges and heat sealing the same along the parallel sides of the block and folding over and sealing to the front wall the extended ears of the extended edges of the wrapping sheet.

15. Apparatus of the class described comprising a horizontal table, a roll of wrapping material positioned at one end of said table, means for pulling a continuous sheet of said material forward on said table, a conveyor having spaced arms adapted to cooperate with said horizontal table and move objects to be wrapped forward on said strip, a knife member for cutting said strip of material into rectangularly shaped sheets, other conveyors for moving said strip forward carrying the object, formers for making an elongated tube around said object to be wrapped, heat-sealing means associated therewith, and other formers for folding the sides of said package and heat-sealing the same, said conveyor having arms which move objects forward in a horizontal plane, a guide for moving the arms upwardly and outwardly and means for moving the arms back to starting position to a horizontal plane when they start forward on said table.

16. Apparatus of the class described comprising a horizontal table, a roll of wrapping material positioned at one end of said table, means for pulling a continuous sheet of said material forward on said table, a conveyor having spaced arms adapted to cooperate with said horizontal table and move objects to be wrapped forward on said strip, a knife member for cutting said strip of material into rectangularly shaped sheets, other conveyors for moving said strip forward carrying the object, formers for making an elongated tube around said object to be wrapped, heat-sealing means associated therewith, and other formers for folding the sides of said package and heat-sealing the same, said conveyor having arms which move objects forward in a horizontal plane, a guide for moving the arms upwardly and outwardly and means for moving the arms back to starting position to a horizontal plane when they start forward on said table, said arms mounted on an endless chain guided in a controlled path.

References Cited in the file of this patent

UNITED STATES PATENTS

| 1,491,269 | Joplin | Apr. 22, 1924 |
| 1,711,228 | Duvall | Apr. 30, 1929 |
| 2,117,347 | Molins | May 17, 1938 |
| 2,255,492 | Peters | Sept. 9, 1941 |
| 2,288,739 | Peters | July 7, 1942 |
| 2,602,276 | Campbell | July 8, 1952 |
| 2,620,964 | Rose | Dec. 9, 1952 |

FOREIGN PATENTS

| 623,243 | France | June 21, 1927 |